United States Patent
Xiong et al.

(10) Patent No.: US 11,314,946 B2
(45) Date of Patent: Apr. 26, 2022

(54) TEXT TRANSLATION METHOD, DEVICE, AND STORAGE MEDIUM

(71) Applicant: BEIJING BAIDU NETCOM SCIENCE AND TECHNOLOGY CO., LTD., Beijing (CN)

(72) Inventors: Hao Xiong, Beijing (CN); Zhongjun He, Beijing (CN); Zhi Li, Beijing (CN); Zhou Xin, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 308 days.

(21) Appl. No.: 16/701,382

(22) Filed: Dec. 3, 2019

(65) Prior Publication Data

US 2020/0193097 A1    Jun. 18, 2020

(30) Foreign Application Priority Data

Dec. 17, 2018 (CN) .......................... 201811541940.6

(51) Int. Cl.
*G06F 40/30* (2020.01)
*G06F 40/51* (2020.01)
*G06F 40/58* (2020.01)
*G06N 3/04* (2006.01)
*G06N 3/08* (2006.01)

(52) U.S. Cl.
CPC .............. *G06F 40/51* (2020.01); *G06F 40/30* (2020.01); *G06F 40/58* (2020.01); *G06N 3/0445* (2013.01); *G06N 3/08* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| | | | | |
|---|---|---|---|---|
| 9,213,694 | B2 * | 12/2015 | Hieber | G06F 40/45 |
| 9,697,201 | B2 * | 7/2017 | Gao | G06F 40/58 |
| 9,959,272 | B1 * | 5/2018 | Čaněk | G06N 3/0454 |
| 10,185,713 | B1 * | 1/2019 | Denkowski | G06F 40/51 |
| 10,437,933 | B1 * | 10/2019 | Clifton | G06F 40/216 |
| 10,963,819 | B1 * | 3/2021 | Gangadharaiah | G06F 40/56 |
| 11,093,110 | B1 * | 8/2021 | Bossio | G06F 40/44 |
| 2010/0262575 | A1 * | 10/2010 | Moore | G06N 20/00 706/59 |
| 2017/0124071 | A1 * | 5/2017 | Huang | G06F 40/51 |
| 2017/0132217 | A1 * | 5/2017 | Na | G06N 3/08 |
| 2017/0161264 | A1 * | 6/2017 | Zhao | G06Q 50/01 |

(Continued)

*Primary Examiner* — Lamont M Spooner
(74) *Attorney, Agent, or Firm* — Lathrop GPM LLP

(57) ABSTRACT

Embodiments of the present disclosure disclose a text translation method, a text translation apparatus, a device and a storage medium. The method includes: obtaining a source language text; and translating the source language text with a modified translation model to obtain a target language text corresponding to the source language text, the modified translation model being obtained by modifying an original translation model based on a text evaluation result of one or more translated texts for training, the translated text for training being an output result after translating through the original translation model, and the text evaluation result for evaluating a contextual semantic relation in the translated text for training.

11 Claims, 5 Drawing Sheets

(56) References Cited

U.S. PATENT DOCUMENTS

| | | | | |
|---|---|---|---|---|
| 2017/0293611 A1* | 10/2017 | Tu | ................. | G06F 16/9535 |
| 2018/0046619 A1* | 2/2018 | Shi | ................. | G06N 3/0454 |
| 2018/0341646 A1* | 11/2018 | Fujiwara | ............. | G06F 40/49 |
| 2019/0065478 A1* | 2/2019 | Tsujikawa | ........... | G10L 15/32 |
| 2020/0073947 A1* | 3/2020 | Bertoldi | ............ | G06F 40/47 |
| 2020/0081982 A1* | 3/2020 | Tu | ..................... | G06F 40/58 |
| 2021/0201147 A1* | 7/2021 | Tu | ..................... | G06N 3/0454 |

* cited by examiner

TEXT TRANSLATION METHOD, DEVICE, AND STORAGE MEDIUM

CROSS-REFERENCE TO RELATED APPLICATION

This application claims priority to and benefits of Chinese Patent Application No. 201811541940.6, filed on Dec. 17, 2018, the entire content of which is incorporated herein by reference.

TECHNICAL FIELD

The present disclosure relates to the field of text translation technologies, and more particularly, to a text translation method, a text translation apparatus, a device, and a storage medium.

BACKGROUND

In the related art, a translation model, such as a neural machine model, is mainly based on sentences for translating a whole text. In detail, the text is split into sentences, then the sentences are translated individually, and finally translation results of the sentences are combined in sequence, to obtain a translation result of the text.

SUMMARY

In a first aspect, embodiments of the present disclosure provide a text translation method, including: obtaining, by one or more computing devices, a source language text; and translating, by the one or more computing devices, the source language text with a modified translation model to obtain a target language text corresponding to the source language text, the modified translation model being obtained by translating a test text with an original translation model to obtain one or more translated texts for training, and modifying the original translation model based on a text evaluation result of the one or more translated texts for training, and the text evaluation result for evaluating a contextual semantic relation in the translated text for training.

In a second aspect, embodiments of the present disclosure provide a device, including: one or more processors; and a storage device, configured to store one or more programs. When the one or more programs are executed by the one or more processors, the one or more processors are configured to implement the above text translation method.

In a third aspect, embodiments of the present disclosure provide a storage medium including a computer executable instruction. When the computer executable instruction is executed by a computer processor, the computer executable instruction is configured to perform the above text translation method.

DETAILED DESCRIPTION

Figure 1:
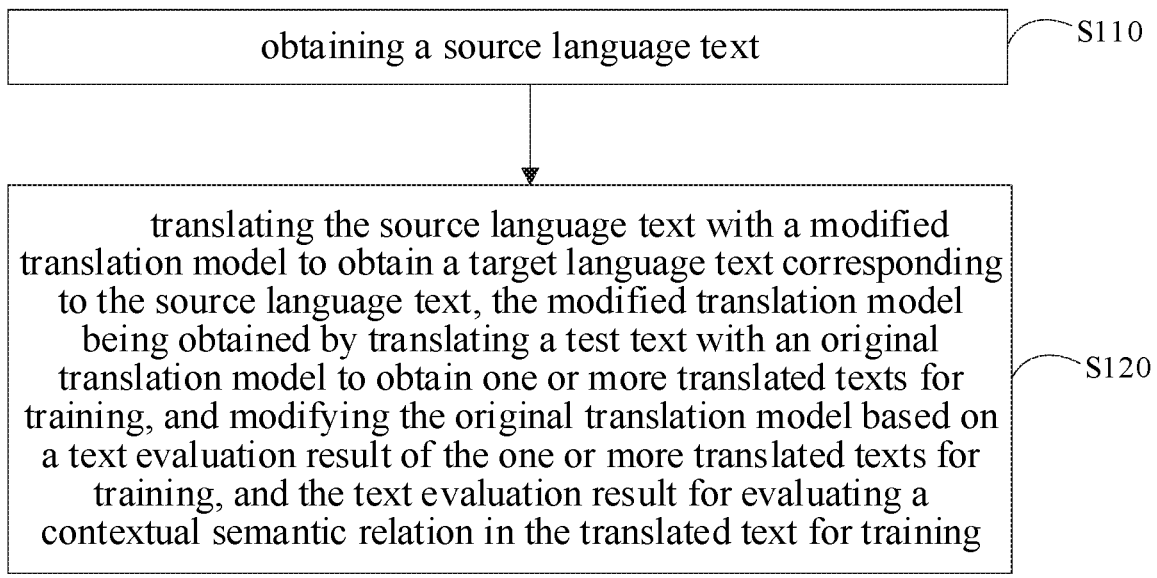
FIG. 1 is a flow chart of a text translation method according to an embodiment of the present disclosure.

In order to make objects, technical solutions and advantages of the present disclosure more apparent, specific embodiments of the present disclosure will be described in detail below with reference to accompanying drawings. It should be understood that, the specific embodiments described herein are only used to explain the present disclosure rather than limit the present disclosure.

In addition, it should also be noted that, for convenience of description, only part but not all structures related to the present disclosure are illustrated in the accompanying drawings. Before discussing exemplary embodiments in detail, it should be noted that some exemplary embodiments are described as processes or methods that are depicted as flow charts. Although a flow chart describes individual operations (or steps) as a sequential process, many of the operations can be performed in parallel, concurrently or simultaneously. Further, the order of the operations may be rearranged. The process may be terminated when its operations are completed, but may also have additional steps not included in the drawings. The process may correspond to a method, a function, a procedure, a subroutine, a subprogram, and the like.

FIG. 1 is a flow chart of a text translation method according to an embodiment of the present disclosure. The method may be executed by a text translation apparatus that may be implemented in hardware and/or software and generally integrated into a device, such as a server. The method includes the following.

At block S110, a source language text is obtained.

In this embodiment, the source language text may be in any language. Further, the source language text may be input by a user, or may be obtained by scanning and image-text conversion or by voice recognition, which is not limited thereto.

At block S120, the source language text is translated with a modified translation model to obtain a target language text corresponding to the source language text. The modified translation model is obtained by translating a test text with an original translation model to obtain one or more translated texts for training, and modifying the original translation model based on a text evaluation result of the one or more translated texts for training. The translated text for training is an output result after translating the test text through the original translation model. The text evaluation result is for evaluating a contextual semantic relation in the translated text for training.

In this embodiment, after the source language text is obtained, the source language text is translated using the modified translation model.

It is known that existing translation models are generally sentence-level translation models, that is, a translation result of a text to be translated is obtained by translating each sentence in the text to be translated separately. Therefore, it is difficult for existing translation models to ensure contextual consistency of the text in the translation result, and the translation fluency is low.

Consequently, in this embodiment, instead of being translated by the existing translation model, the source language text is translated by the modified translation model obtained by modifying the original translation model based on the text evaluation result of the translated text for training. The text evaluation result is used for evaluating the contextual semantic relation in the translated text for training. Therefore, modifying the original translation model with the text evaluation result of the translated text for training may improve contextual semantic consistency of the translated text output by the modified translation model.

It is known that many models may automatically modify their parameters based on externally feedback data. In this embodiment, the text evaluation result of the translated text for training is external data fed back to the translation model, and the translation model may automatically modify its parameters based on the text evaluation result.

This embodiment of the present disclosure provides the text translation method. By translating the source language text with the modified translation model that is modified based on the text evaluation result of the translated text for training, the text translation method overcomes technical defects of poor contextual semantics consistency and low fluency of the translated text obtained by translating each sentence independently, improves a translation accuracy of the translation model through effectively modifying the translation model, and further improves contextual semantics consistency and fluency of the translated text.

Figure 2:
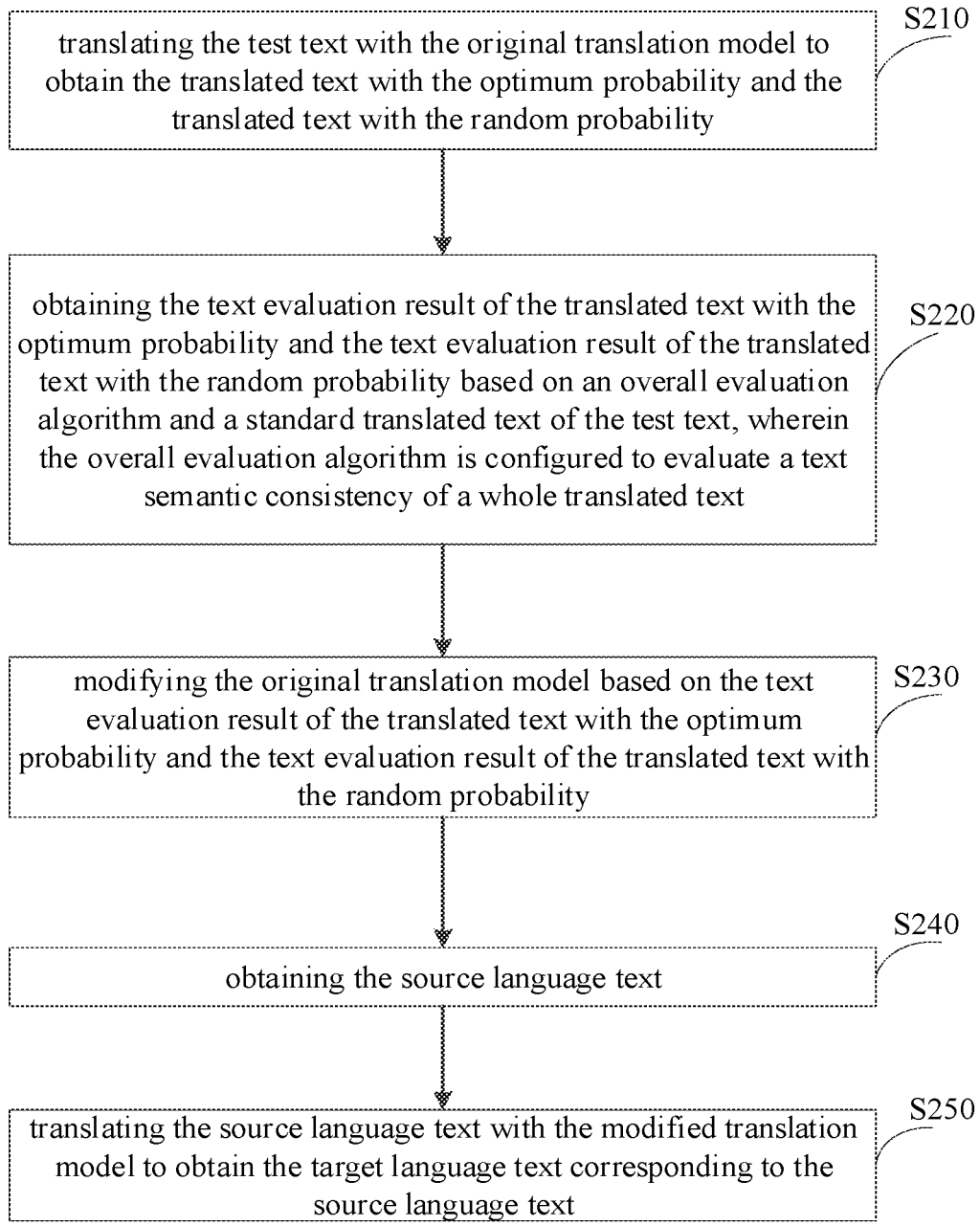
FIG. 2 is a flow chart of a text translation method according to an embodiment of the present disclosure.

FIG. 2 is a flow chart of a text translation method according to an embodiment of the present disclosure. This embodiment is based on the embodiment in FIG. 1. This embodiment provides an implementation of embodying the text evaluation result, introducing a model modification step, and embodying a manner for obtaining a translated text with an optimum probability and a translated text with a random probability.

Correspondingly, the method includes the following.

At block S210, the translated text with the optimum probability and the translated text with the random probability of the original translation model to a test text are obtained.

In this embodiment, modification steps, i.e., blocks 210 to 230, are introduced. Further, in the present embodiment, the text evaluation result of the translated text for training includes a text evaluation result of the translated text with the optimum probability and a text evaluation result of the translated text with the random probability. Therefore, in blocks 210 to 230, the original translation model is modified based on the text evaluation result of the translated text with the optimum probability and the text evaluation result of the translated text with the random probability.

First, the translated text with the optimum probability and the translated text with the random probability of the original translation model to the test text are obtained through block 210.

The translated text with the optimum probability may be obtained by translating the test text with the original translation model, and by selecting a target word with a maximum probability as a translation result of a word in a translation process. The translated text with the random probability may be obtained by translating the test text with the original translation model, and by determining a translation result of a word based on a probability distribution of the target word in a translation process.

At block S220, the text evaluation result of the translated text with the optimum probability and the text evaluation result of the translated text with the random probability are obtained based on an overall evaluation algorithm and a standard translated text of the test text. The overall evaluation algorithm is configured to evaluate a text semantic consistency of a whole translated text.

In this embodiment, the text evaluation result of the translated text with the optimum probability is obtained by calculating through the overall evaluation algorithm based on the standard translated text of the test text and the translated text with the optimum probability with. Similarly, the text evaluation result of the translated text with the random probability is obtained by calculating through the overall evaluation algorithm based on the standard translated text of the test text and the translated text with the random probability.

The overall evaluation algorithm is used for evaluating the text semantic consistency of the translated text, and is typically, for example, a bilingual evaluation understudy (BLEU) algorithm.

At block S230, the original translation model is modified based on the text evaluation result of the translated text with the optimum probability and the text evaluation result of the translated text with the random probability to obtain the modified translation model.

In this embodiment, the original translation model is modified based on the text evaluation result of the translated text with the optimum probability and the text evaluation result of the translated text with the random probability. In detail, the original translation model may be modified based on a calculation result such as a difference, a squared difference between the text evaluation result of the translated text with the optimum probability and the text evaluation result of the translated text with the random probability.

At block S240, the source language text is obtained.

At block S250, the source language text is translated with the modified translation model to obtain the target language text corresponding to the source language text.

This embodiment of the present disclosure provides the text translation method, which embodies the text evaluation result and manners of obtaining the translated text with the optimum probability and the translated text with the random probability, and introduces model modification steps, so that the original translation model is modified quickly, simply and effectively, and the translation accuracy of the modified translation model is effectively improved.

Figure 3:
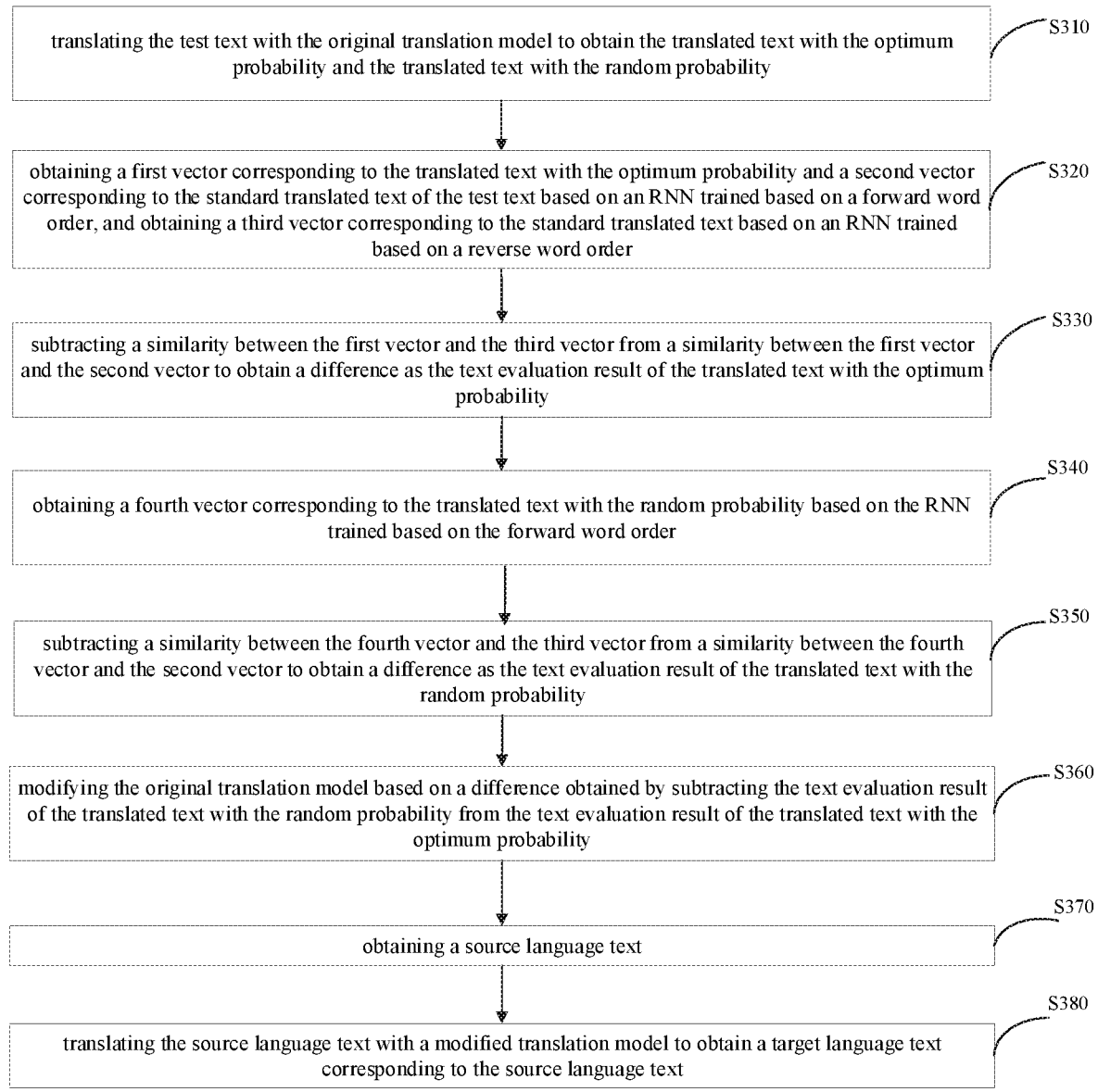
FIG. 3 is a flow chart of a text translation method according to an embodiment of the present disclosure.

FIG. 3 is a flow chart of a text translation method according to an embodiment of the present disclosure. The present embodiment is on the basis of the above-described embodiments. This embodiment provides an implementation of embodying the overall evaluation algorithm as an incentive algorithm, embodying a manner of obtaining the text evaluation result corresponding to the incentive algorithm, embodying a model modification manner, and embodying a structure of the modified translation model.

Correspondingly, the method includes the following.

At block S310, the translated text with the optimum probability and the translated text with the random probability of the original translation model to the test text are obtained.

At block S320, a first vector corresponding to the translated text with the optimum probability and a second vector corresponding to the standard translated text of the test text are obtained based on a recurrent neural network (RNN) trained based on a forward word order, and a third vector corresponding to the standard translated text is obtained based on an RNN trained based on a reverse word order.

In this embodiment, the overall evaluation algorithm, is an incentive algorithm, and blocks 320 to 350 are processes of calculating the text evaluation result with the incentive algorithm.

In this embodiment, the RNN trained based on the forward word order, refers to an RNN in which a text with a normal word order is used as a training sample. The RNN trained based on the reverse word order, refers to an RNN in which a text with a reverse word order is used as a training sample. The training sample of the RNN trained based on the forward word order is same as a sample of a normal word order corresponding to the training sample of the RNN trained based on the reverse word order. Based on the above description, the RNN trained based on the forward word order and the RNN trained based on the reverse word order may guarantee that two vectors output by the two RNNs for the same input data have the lowest similarity.

Based on the above characteristics, in this embodiment, the RNN trained based on the forward word order and the RNN trained based on the reverse word order are used to obtain the second vector and the third vector corresponding to the standard translated text of the test text. In addition, the first vector corresponding to the translated text with the optimum probability is obtained by using the RNN trained based on the forward word order. The contextual semantic consistency of the translated text with the optimum probability may be determined based on a similarity between the first vector and the second vector and a similarity between the first vector and the third vector. When the similarity between the first vector and the second vector is greater than the similarity between the first vector and the third vector, the contextual semantic consistency of the translated text with the optimum probability is good; and when the similarity between the first vector and the second vector is smaller than the similarity between the first vector and the third vector, the contextual semantic consistency of the translated text with the optimum probability is poor.

At block S330, a similarity between the first vector and the third vector is subtracted from a similarity between the first vector and the second vector to obtain a difference as the text evaluation result of the translated text with the optimum probability.

In this embodiment, the text evaluation result of the translated text with the optimum probability is the difference obtained by subtracting the similarity between the first vector and the third vector from the similarity between the first vector and the second vector. The greater the difference is, the better the contextual semantic consistency of the translated text with the optimum probability is.

At block S340, a fourth vector corresponding to the translated text with the random probability is obtained based on the RNN trained based on the forward word order.

Similarly, in the present embodiment, the RNN trained based on the forward word order is also used to obtain the fourth vector corresponding to the translated text with the random probability. And then, the contextual semantic consistency of the translated text with the random probability may be determined based on the similarity between the fourth vector and the second vector and the similarity between the fourth vector and the third vector. When the similarity between the fourth vector and the second vector is greater than the similarity between the fourth vector and the third vector, the translated text with the random probability is considered to have good semantic consistency; and when the similarity between the fourth vector and the second vector is smaller than the similarity between the fourth vector and the third vector, the translated text with the random probability is considered to have poor semantic consistency.

At block S350, a similarity between the fourth vector and the third vector is subtracted from a similarity between the fourth vector and the second vector to obtain a difference as the text evaluation result of the translated text with the random probability.

Similarly, in the present embodiment, the text evaluation result of the translated text with the random probability is a difference obtained by subtracting the similarity between the fourth vector and the third vector from the similarity between the fourth vector and the second vector. The greater the difference is, the better the contextual semantic consistency of the translated text with the random probability is.

At block S360, the original translation model is modified based on a difference obtained by subtracting the text evaluation result of the translated text with the random probability from the text evaluation result of the translated text with the optimum probability.

In detail, in the present embodiment, the original translation model is modified based on the difference obtained by subtracting the text evaluation result of the translated text with the random probability from the text evaluation result of the translated text with the optimum probability. The difference may reflect a comparison result of consistency of the translated text with the optimum probability and the translated text with the random probability. When the difference is a positive number, it is determined that the consistency of the translated text with the optimum probability is better than the consistency of the translated text with the random probability; and when the difference is a negative number, it is determined that the consistency of the translated text with the optimum probability is worse than the consistency of the translated text with the random probability.

Further, the modification manner of the original translation model may be that the difference obtained by subtracting the text evaluation result of the translated text with the random probability from the text evaluation result of the translated text with the optimum probability is multiplied by a gradient of the original translation model to obtain the modified translation model.

At block S370, the source language text is obtained.

At block S380, the source language text is translated with the modified translation model to obtain the target language text corresponding to the source language text.

Figure 4:
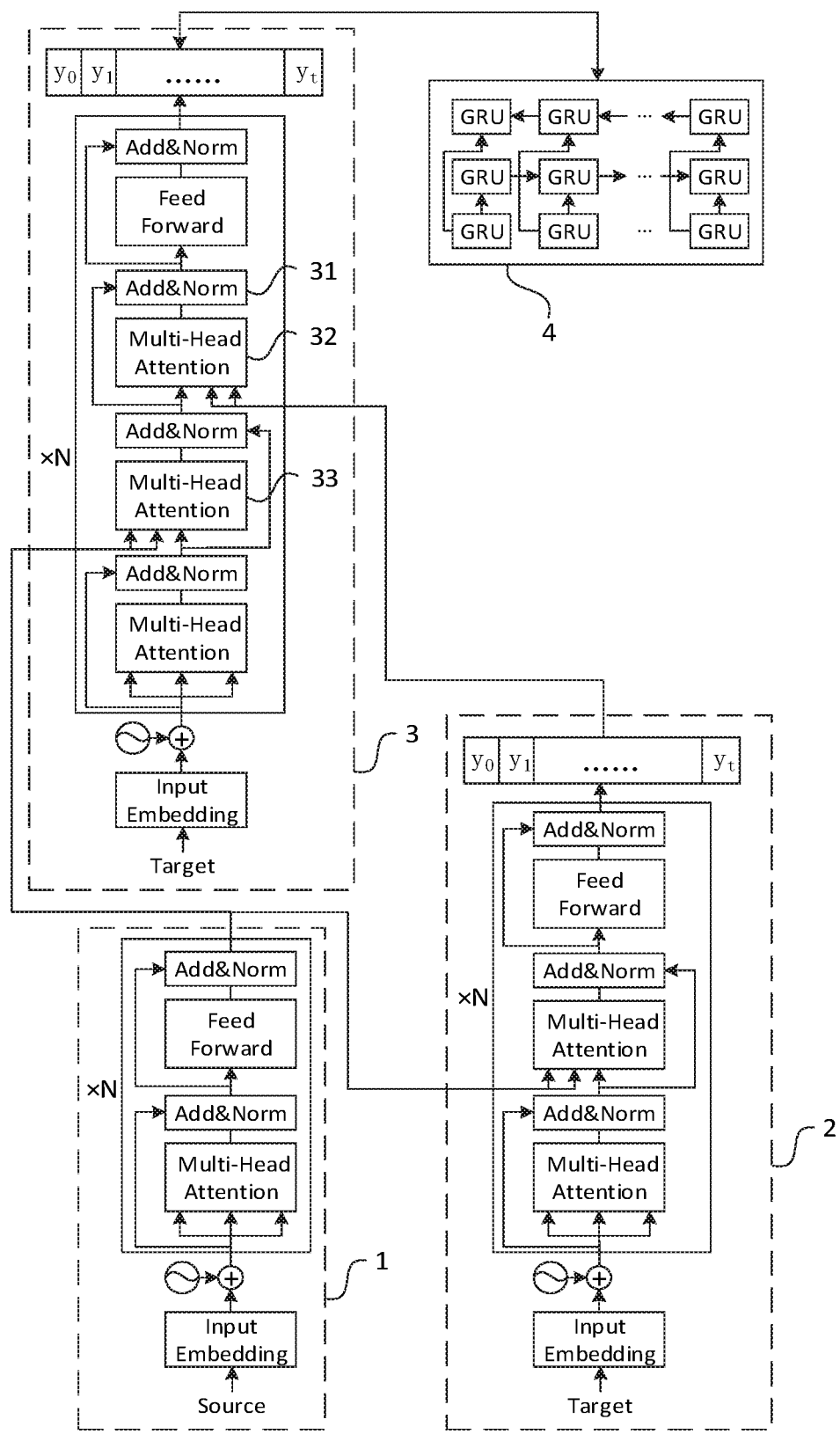
FIG. 4 is a schematic diagram of a modified translation model according to an embodiment of the present disclosure.

In this embodiment, as shown in FIG. 4, the modified translation model includes: an encoder 1 based on self-attention mechanism, a first decoder 2 based on self-attention mechanism and a second decoder 3 based on self-attention mechanism. The encoder 1 and the first decoder 2 form a Transformer model based on self-attention mechanism.

The second decoder 3 includes the first decoder 2, N multi-head self-attention mechanism layers 32 and N fully-connected forward neural networks 31, and N is the number of network blocks included in the first decoder. The N fully-connected forward neural networks 31 are connected with Feed Forward layers in the N network blocks and are positioned in front of the Feed Forward layers, and the N multi-head self-attention mechanism layers 32 are connected with the N fully-connected forward neural networks 31 and are positioned in front of the fully-connected forward neural networks 31. An input of a newly-added multi-head self-attention mechanism layer 32 includes an output of the first decoder 2; and an input of the multi-head self-attention mechanism layers 33 before the newly-added multi-head self-attention mechanism layer 32 includes an output of the encoder 1.

Further, FIG. 4 also illustrates a recurrent neural network 4 for calculating a difference obtained by subtracting the text evaluation result of the translated text with the random probability from the text evaluation result of the translated text with the optimum probability. The recurrent neural network 4 includes the RNN trained based on forward word order and the RNN trained based on reverse word order. The recurrent neural network 4 directly obtains the output result of the second decoder 3 and feeds back the difference obtained by subtracting the text evaluation result of the translated text with the random probability from the text evaluation result of the translated text with the optimum probability to the second decoder to modify the translation model.

This embodiment of the present disclosure provides the text translation method, which embodies the overall evaluation algorithm as the incentive algorithm and embodies the manner of obtaining the text evaluation result corresponding to the incentive algorithm, so that the text evaluation result may correctly reflect translation accuracy of the original translation model, and further, the original translation model may be more effectively modified. The method further embodies the modification manner and the structure of the modified translation model, so that the modified translation model may effectively modify its parameters based on the text evaluation result.

It should be noted that, in a conventional neural network machine translation model, sentences in a batch are generally randomly selected. However, in this embodiment, when the original translation model is trained, sentences in a batch are required to be all the sentences included in a chapter, so as to ensure that the first decoder may output an individual translation result of each sentence in the chapter. And then the second decoder may use the output result of the first decoder as the context translation information, and translate with reference to the context translation information, thereby further improving the contextual semantic consistency of the output translation.

On the basis of the above embodiments, the overall evaluation algorithm, is embodied as the BLEU algorithm.

Correspondingly, obtaining the text evaluation result of the translated text with the optimum probability and the text evaluation result of the translated text with the random probability based on the overall evaluation algorithm and the standard translated text of the test text may include: calculating a BLEU value between the standard translated text of the test text and the translated text with the optimum probability, and taking the calculated BLEU value as the text evaluation result of the translated text with the optimum probability; and calculating a BLEU value between the standard translated text of the test text and the translated text with the random probability, and taking the calculated BLEU value as the text evaluation result of the translated text with the random probability.

Such an arrangement is advantageous in that the text evaluation result may correctly reflect the translation accuracy of the original translation model.

Figure 5:
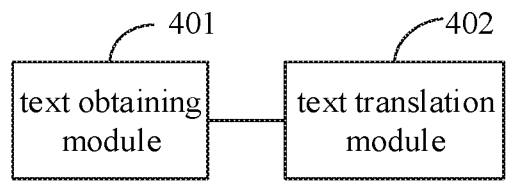
FIG. 5 is a block diagram of a text translation apparatus according to an embodiment of the present disclosure.

FIG. 5 is a block diagram of a text translation apparatus according to an embodiment of the present disclosure. As shown in FIG. 5, the apparatus includes: a text obtaining module 401 and a text translation module 402.

The text obtaining module 401 is configured to obtain a source language text.

The text translation module 402 is configured to translate the source language text with a modified translation model to obtain a target language text corresponding to the source language text, the modified translation model being obtained by translating a test text with an original translation model to obtain one or more translated texts for training, and by modifying the original translation model based on a text evaluation result of the one or more translated texts for training, the translated text for training being an output result after translating through the original translation model, and the text evaluation result for evaluating a contextual semantic relation in the translated text for training.

This embodiment of the present disclosure provides the text translation apparatus. The apparatus first obtains the source language text through the text obtaining module 401; and then, translates the source language text through the text translation module 402 by using the modified translation model to obtain the target language text corresponding to the source language text. The modified translation model is a translation model obtained by modifying the original translation model based on the text evaluation result of the translated text for training, the translated text for training is an output result after translating through the original translation model, and the text evaluation result is used for evaluating a contextual semantic relation in the translated text for training.

The apparatus overcomes technical defects of poor contextual semantics consistency and low fluency of the translated text obtained by translating each sentence independently, improves a translation accuracy of the translation model through effectively modifying the translation model, and further improves contextual semantics consistency and fluency of the translated text.

On the basis of the above embodiments, the text evaluation result of the translated text for training may include: a text evaluation result of a translated text with an optimum probability and a text evaluation result of a translated text with a random probability.

On the basis of the above embodiments, the apparatus further includes a translation obtaining module, a translation evaluation module and a model modification module.

The translation obtaining module is configured to obtain the translated text with the optimum probability and the translated text with the random probability of the original translation model to a test text before the source language text is translated by using the modified translation model.

The translation evaluation module is configured to obtain the text evaluation result of the translated text with the optimum probability and the text evaluation result of the translated text with the random probability based on an overall evaluation algorithm and a standard translated text of the test text. The overall evaluation algorithm is configured to evaluate a text semantic consistency of a whole translated text.

The model modification module is configured to modify the original translation model based on the text evaluation result of the translated text with the optimum probability and the text evaluation result of the translated text with the random probability.

On the basis of the above embodiments, the translation obtaining module may include: a first obtaining unit and a second obtaining unit.

The first obtaining unit is configured to translate the test text with the original translation model, and selecting a target word with a maximum probability during the translating as a translation result of a word to obtain the translated text with the optimum probability.

The second obtaining unit is configured to translate the test text with the original translation model, and determining a translation result of a word based on a probability distribution of the target word during the translating to obtain the translated text with the random probability.

On the basis of the above embodiments, the overall evaluation algorithm may be a BLEU algorithm.

Correspondingly, the translation evaluation module may include: a first BLEU calculating unit and a second BLEU calculating unit.

The first BLEU calculating unit is configured to calculate a BLEU value between the standard translated text of the test text and the translated text with the optimum probability, and take the calculated BLEU value as the text evaluation result of the translated text with the optimum probability.

The second BLEU calculating unit is configured to calculate a BLEU value between the standard translated text of the test text and the translated text with the random probability, and take the calculated BLEU value as the text evaluation result of the translated text with the random probability.

On the basis of the above embodiments, the overall evaluation algorithm may be an incentive algorithm.

Correspondingly, the translation evaluation module may further include: a first vector obtaining unit, a first evaluation unit, a second vector obtaining unit and a second evaluation unit.

The first vector obtaining unit is configured to obtain a first vector corresponding to the translated text with the optimum probability and a second vector corresponding to the standard translated text of the test text based on a recurrent neural network (RNN) trained based on a forward word order, and obtain a third vector corresponding to the standard translated text based on an RNN trained based on a reverse word order.

The first evaluation unit is configured to subtract a similarity between the first vector and the third vector from a similarity between the first vector and the second vector to obtain a difference as the text evaluation result of the translated text with the optimum probability.

The second vector obtaining unit is configured to obtain a fourth vector corresponding to the translated text with the random probability based on the RNN trained based on the forward word order.

The second evaluation unit is configured to subtract a similarity between the fourth vector and the third vector from a similarity between the fourth vector and the second vector to obtain a difference as the text evaluation result of the translated text with the random probability.

On the basis of the above embodiments, the model modification module may be configured to: modify the original translation model based on a difference obtained by subtracting the text evaluation result of the translated text with the random probability from the text evaluation result of the translated text with the optimum probability.

On the basis of the above embodiments, the modified translation model may in detail include: an encoder based on self-attention mechanism, a first decoder based on self-attention mechanism and a second decoder based on self-attention mechanism, the encoder and the first decoder forming a Transformer model based on self-attention mechanism.

The second decoder includes the first decoder, N multi-head self-attention mechanism layers and N fully-connected forward neural networks, N being the number of network blocks included in the first decoder.

The N fully-connected forward neural networks are connected with Feed Forward layers in the N network blocks and are positioned in front of the Feed Forward layers, and the N multi-head self-attention mechanism layers are connected with the N fully-connected forward neural networks and are positioned in front of the N fully-connected forward neural networks.

An input of a newly-added multi-head self-attention mechanism layer comprises an output of the first decoder.

An input of a multi-head self-attention mechanism layers before the newly-added multi-head self-attention mechanism layer comprises an output of the encoder.

The text translation apparatus provided by this embodiment of the present disclosure may be configured to execute the text translation method provided by any embodiment of the present disclosure, has corresponding functional modules and realizes the same beneficial effects.

Figure 6:
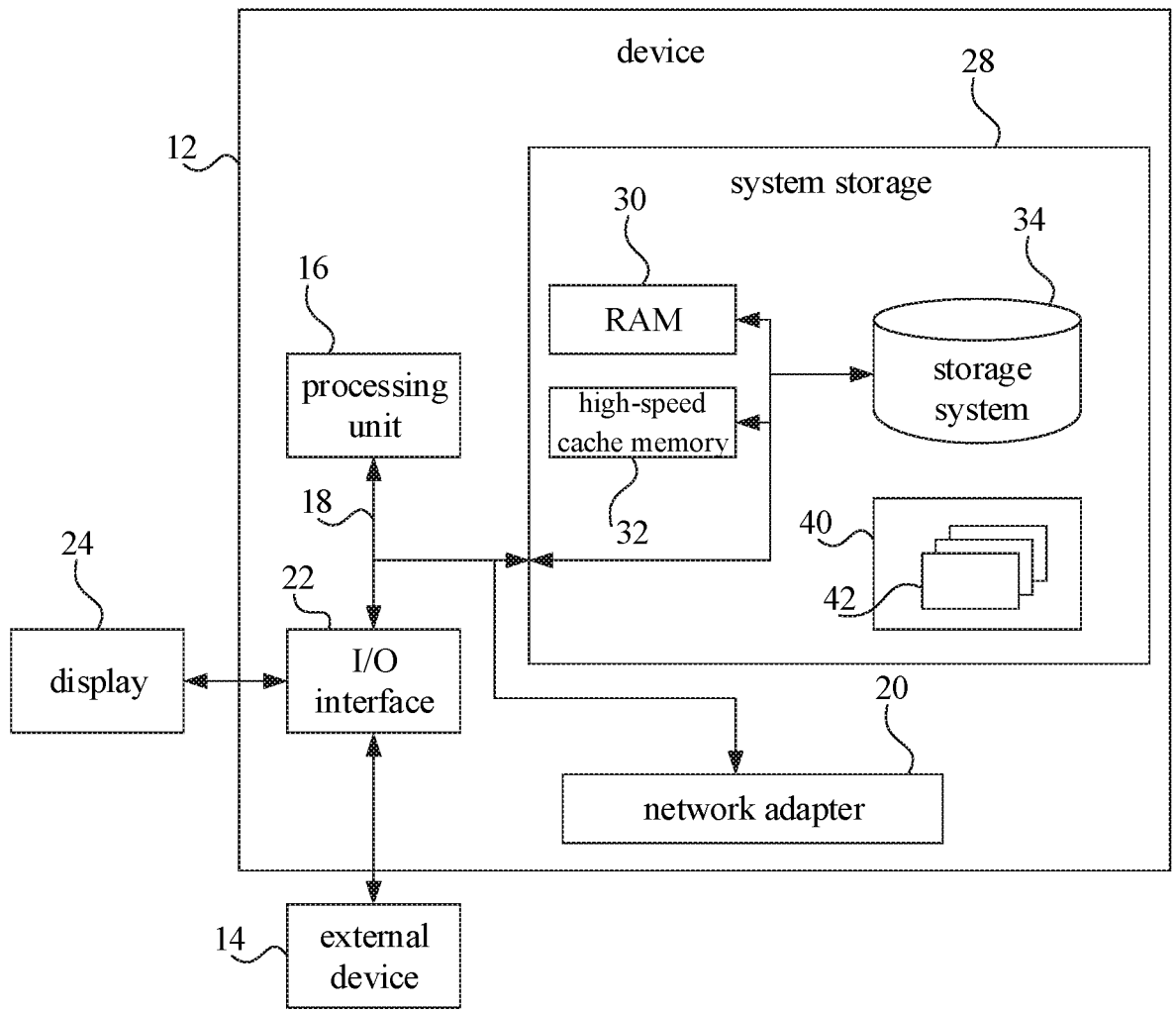
FIG. 6 is a block diagram of a device according to an embodiment of the present disclosure.

FIG. 6 is a block diagram of a device according to an embodiment of the present disclosure. FIG. 6 illustrates a block diagram of an exemplary device 12 for implementing embodiments of the present disclosure. The device 12 illustrated in FIG. 6 is only illustrated as an example, and should not be considered as any restriction on the function and the usage range of embodiments of the present disclosure.

As illustrated in FIG. 6, the device 12 is in the form of a general-purpose computing apparatus. The device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory controller, a peripheral bus, a graphic acceleration port (GAP), a processor, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the device 12 may include multiple kinds of computer-readable media. These media may be any storage media accessible by the device 12, including transitory or non-transitory storage medium and movable or unmovable storage medium.

The memory 28 may include a computer-readable medium in a form of volatile memory, such as a random-access memory (RAM) 30 and/or a high-speed cache memory 32. The device 12 may further include other transitory/non-transitory storage media and movable/unmovable storage media. In way of example only, the storage system 34 may be used to read and write non-removable, non-volatile magnetic media (not shown in the figure, commonly referred to as "hard disk drives"). Although not illustrated in FIG. 6, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in memory 28. The program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The device 12 may also communicate with one or more external devices 14 (e.g., a keyboard, a pointing device, a display 24, and etc.) and may also communicate with one or more devices that enables a user to interact with the computer system/server 12, and/or any device (e.g., a network card, a modem, and etc.) that enables the computer system/server 12 to communicate with one or more other computing devices. This kind of communication can be achieved by the input/output (I/O) interface 22. In addition, the device 12 may be connected to and communicate with one or more networks such as a local area network (LAN), a wide area network (WAN) and/or a public network such as the Internet through a network adapter 20. As shown in FIG. 6, the network adapter 20 communicates with other modules of the device 12 over bus 18. It should be understood that although not shown in the figure, other hardware and/or software modules may be used in combination with the device 12, which including, but not limited to, microcode, device drivers, redundant processing units, external disk drive arrays, RAID systems, tape drives, as well as data backup storage systems and the like.

The processing unit 16 can perform various functional applications and data processing by running programs stored in the system memory 28, for example, to perform the text translation method provided by embodiments of the present disclosure, i.e., obtaining a source language text; and translating the source language text with a modified translation model to obtain a target language text corresponding to the source language text, the modified translation model being obtained by modifying an original translation model based on a text evaluation result of one or more translated texts for training, the translated text for training being an output result after translating through the original translation model, and the text evaluation result for evaluating a contextual semantic relation in the translated text for training.

Embodiment of the present disclosure further provides a storage medium including computer executable instructions. When the computer executable instructions are executed by a computer processor, the text translation method according to embodiments of the present disclosure is executed, i.e., obtaining a source language text; and translating the source language text with a modified translation model to obtain a target language text corresponding to the source language text, the modified translation model being obtained by modifying an original translation model based on a text evaluation result of one or more translated texts for training, the translated text for training being an output result after translating through the original translation model, and the text evaluation result for evaluating a contextual semantic relation in the translated text for training.

The computer storage medium according to embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (LAN) or a Wide Area Network (WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A text translation method, comprising:
   obtaining, by one or more computing devices, a source language text; and
   translating, by the one or more computing devices, the source language text with a modified translation model to obtain a target language text corresponding to the source language text, the modified translation model being obtained by translating a test text with an original translation model to obtain one or more translated texts for training, and modifying the original translation model based on a text evaluation result of the one or more translated texts for training, and the text evaluation result for evaluating a contextual semantic relation in the translated text for training, wherein the text evaluation result of the one or more translated texts for training, comprising a text evaluation result of a translated text with an optimum probability, and a text evaluation result of a translated text with a random probability;

translating, by the one or more computing devices, the test text with the original translation model to obtain the translated text with the optimum probability and the translated text with the random probability;

obtaining, by the one or more computing devices, the text evaluation result of the translated text with the optimum probability and the text evaluation result of the translated text with the random probability based on an overall evaluation algorithm and a standard translated text of the test text, wherein the overall evaluation algorithm is configured to evaluate a text semantic consistency of a whole translated text; and modifying, by the one or more computing devices, the original translation model based on the text evaluation result of the translated text with the optimum probability and the text evaluation result of the translated text with the random probability, wherein the overall evaluation algorithm is an incentive algorithm;

obtaining the text evaluation result of the translated text with the optimum probability and the text evaluation result of the translated text with the random probability based on the overall evaluation algorithm and the standard translated text of the test text comprises:

obtaining a first vector corresponding to the translated text with the optimum probability and a second vector corresponding to the standard translated text of the test text based on a recurrent neural network (RNN) trained based on a forward word order, and obtaining a third vector corresponding to the standard translated text based on an RNN trained based on a reverse word order;

subtracting a similarity between the first vector and the third vector from a similarity between the first vector and the second vector to obtain a difference as the text evaluation result of the translated text with the optimum probability;

obtaining a fourth vector corresponding to the translated text with the random probability based on the RNN trained based on the forward word order; and subtracting a similarity between the fourth vector and the third vector from a similarity between the fourth vector and the second vector to obtain a difference as the text evaluation result of the translated text with the random probability.

2. The method of claim 1, wherein obtaining the translated text with the optimum probability and the translated text with the random probability of the original translation model to the test text comprises:

translating the test text with the original translation model, and selecting a target word with a maximum probability during the translating as a translation result of a word to obtain the translated text with the optimum probability; and translating the test text with the original translation model, and determining a translation result of a word based on a probability distribution of the target word during the translating to obtain the translated text with the random probability.

3. The method of claim 1, wherein the overall evaluation algorithm is a bilingual evaluation understudy (BLEU) algorithm;

obtaining the text evaluation result of the translated text with the optimum probability and the text evaluation result of the translated text with the random probability based on the overall evaluation algorithm and the standard translated text of the test text comprises:

calculating a BLEU value between the standard translated text of the test text and the translated text with the optimum probability, and taking the calculated BLEU value as the text evaluation result of the translated text with the optimum probability; and calculating a BLEU value between the standard translated text of the test text and the translated text with the random probability, and taking the calculated BLEU value as the text evaluation result of the translated text with the random probability.

4. The method of claim 1, wherein modifying the original translation model based on the text evaluation result of the translated text with the optimum probability and the text evaluation result of the translated text with the random probability comprises:

modifying the original translation model based on a difference obtained by subtracting the text evaluation result of the translated text with the random probability from the text evaluation result of the translated text with the optimum probability.

5. A device, comprising:
one or more processors; and
a storage device, configured to store one or more programs;

wherein, when the one or more programs are executed by the one or more processors, the one or more processors are configured to implement:

obtaining a source language text; and translating the source language text with a modified translation model to obtain a target language text corresponding to the source language text, the modified translation model being obtained by translating a test text with an original translation model to obtain one or more translated texts for training, and modifying the original translation model based on a text evaluation result of the one or more translated texts for training, and the text evaluation result for evaluating a contextual semantic relation in the translated text for training, wherein the text evaluation result of the one or more translated texts for training, comprising a text evaluation result of a translated text with an optimum probability, and a text evaluation result of a translated text with a random probability;

translating, by the one or more computing devices, the test text with the original translation model to obtain the translated text with the optimum probability and the translated text with the random probability;

obtaining, by the one or more computing devices, the text evaluation result of the translated text with the optimum probability and the text evaluation result of the translated text with the random probability based on an overall evaluation algorithm and a standard translated text of the test text, wherein the overall evaluation algorithm is configured to evaluate a text semantic consistency of a whole translated text; and modifying, by the one or more computing devices, the original translation model based on the text evaluation result of the translated text with the optimum probability and the text evaluation result of the translated text with the random probability, wherein the overall evaluation algorithm is an incentive algorithm;

obtaining the text evaluation result of the translated text with the optimum probability and the text evaluation result of the translated text with the random probability based on the overall evaluation algorithm and the standard translated text of the test text comprises:
    obtaining a first vector corresponding to the translated text with the optimum probability and a second vector corresponding to the standard translated text of the test text based on a recurrent neural network (RNN) trained based on a forward word order, and obtaining a third vector corresponding to the standard translated text based on an RNN trained based on a reverse word order;
    subtracting a similarity between the first vector and the third vector from a similarity between the first vector and the second vector to obtain a difference as the text evaluation result of the translated text with the optimum probability;
    obtaining a fourth vector corresponding to the translated text with the random probability based on the RNN trained based on the forward word order; and
    subtracting a similarity between the fourth vector and the third vector from a similarity between the fourth vector and the second vector to obtain a difference as the text evaluation result of the translated text with the random probability.

6. The device of claim 5, wherein obtaining the translated text with the optimum probability and the translated text with the random probability of the original translation model to the test text comprises:
    translating the test text with the original translation model, and selecting a target word with a maximum probability during the translating as a translation result of a word to obtain the translated text with the optimum probability; and
    translating the test text with the original translation model, and determining a translation result of a word based on a probability distribution of the target word during the translating to obtain the translated text with the random probability.

7. The device of claim 5, wherein the overall evaluation algorithm is a bilingual evaluation understudy (BLEU) algorithm;
    obtaining the text evaluation result of the translated text with the optimum probability and the text evaluation result of the translated text with the random probability based on the overall evaluation algorithm and the standard translated text of the test text comprises:
    calculating a BLEU value between the standard translated text of the test text and the translated text with the optimum probability, and taking the calculated BLEU value as the text evaluation result of the translated text with the optimum probability; and
    calculating a BLEU value between the standard translated text of the test text and the translated text with the random probability, and taking the calculated BLEU value as the text evaluation result of the translated text with the random probability.

8. The device of claim 5, wherein modifying the original translation model based on the text evaluation result of the translated text with the optimum probability and the text evaluation result of the translated text with the random probability comprises:
    modifying the original translation model based on a difference obtained by subtracting the text evaluation result of the translated text with the random probability from the text evaluation result of the translated text with the optimum probability.

9. A non-transient machine-readable storage medium comprising a computer executable instruction, wherein when the computer executable instruction is executed by a computer processor, the computer executable instruction is configured to perform a text translation method comprising:
    obtaining a source language text; and
    translating the source language text with a modified translation model to obtain a target language text corresponding to the source language text, the modified translation model being obtained by translating a test text with an original translation model to obtain one or more translated texts for training, and modifying the original translation model based on a text evaluation result of the one or more translated texts for training, and the text evaluation result for evaluating a contextual semantic relation in the translated text for training, wherein the text evaluation result of the one or more translated texts for training, comprises: a text evaluation result of a translated text with an optimum probability, and a text evaluation result of a translated text with a random probability;
    translating, by the one or more computing devices, the test text with the original translation model to obtain the translated text with the optimum probability and the translated text with the random probability;
    obtaining, by the one or more computing devices, the text evaluation result of the translated text with the optimum probability and the text evaluation result of the translated text with the random probability based on an overall evaluation algorithm and a standard translated text of the test text, wherein the overall evaluation algorithm is configured to evaluate a text semantic consistency of a whole translated text; and
    modifying, by the one or more computing devices, the original translation model based on the text evaluation result of the translated text with the optimum probability and the text evaluation result of the translated text with the random probability,
    wherein the overall evaluation algorithm is an incentive algorithm;
    obtaining the text evaluation result of the translated text with the optimum probability and the text evaluation result of the translated text with the random probability based on the overall evaluation algorithm and the standard translated text of the test text comprises:
    obtaining a first vector corresponding to the translated text with the optimum probability and a second vector corresponding to the standard translated text of the test text based on a recurrent neural network (RNN) trained based on a forward word order, and obtaining a third vector corresponding to the standard translated text based on an RNN trained based on a reverse word order;
    subtracting a similarity between the first vector and the third vector from a similarity between the first vector and the second vector to obtain a difference as the text evaluation result of the translated text with the optimum probability;
    obtaining a fourth vector corresponding to the translated text with the random probability based on the RNN trained based on the forward word order; and
    subtracting a similarity between the fourth vector and the third vector from a similarity between the fourth vector and the second vector to obtain a difference as the text evaluation result of the translated text with the random probability.

10. The non-transient machine-readable storage medium of claim 9, wherein obtaining the translated text with the optimum probability and the translated text with the random probability of the original translation model to the test text comprises:

translating the test text with the original translation model, and selecting a target word with a maximum probability during the translating as a translation result of a word to obtain the translated text with the optimum probability; and translating the test text with the original translation model, and determining a translation result of a word based on a probability distribution of the target word during the translating to obtain the translated text with the random probability.

11. The non-transient machine-readable storage medium of claim 9, wherein the overall evaluation algorithm is a bilingual evaluation understudy (BLEU) algorithm;

obtaining the text evaluation result of the translated text with the optimum probability and the text evaluation result of the translated text with the random probability based on the overall evaluation algorithm and the standard translated text of the test text comprises:

calculating a BLEU value between the standard translated text of the test text and the translated text with the optimum probability, and taking the calculated BLEU value as the text evaluation result of the translated text with the optimum probability; and calculating a BLEU value between the standard translated text of the test text and the translated text with the random probability, and taking the calculated BLEU value as the text evaluation result of the translated text with the random probability.

* * * * *